(12) United States Patent
Broug-Holub

(10) Patent No.: US 12,544,459 B2
(45) Date of Patent: *Feb. 10, 2026

(54) METHODS AND MEANS FOR THE PREVENTION AND/OR TREATMENT OF HEMOPHILIC ARTHROPATHY IN HEMOPHILIA

(71) Applicant: UNIQURE BIOPHARMA B.V., Amsterdam (NL)

(72) Inventor: Ellen Broug-Holub, Amsterdam (NL)

(73) Assignee: UNIQURE BIOPHARMA B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 19/046,845

(22) Filed: Feb. 6, 2025

(65) Prior Publication Data

US 2025/0170275 A1    May 29, 2025

Related U.S. Application Data

(60) Division of application No. 18/508,998, filed on Nov. 14, 2023, which is a continuation of application No. 18/556,163, filed as application No. PCT/EP2022/060774 on Apr. 22, 2022.

(30) Foreign Application Priority Data

Apr. 23, 2021   (EP) .................... 21170264

(51) Int. Cl.
| | |
|---|---|
| A61K 48/00 | (2006.01) |
| A61P 7/04 | (2006.01) |
| C12N 9/64 | (2006.01) |
| C12N 15/86 | (2006.01) |

(52) U.S. Cl.
CPC ........ *A61K 48/005* (2013.01); *A61K 48/0058* (2013.01); *A61P 7/04* (2018.01); *C12N 9/644* (2013.01); *C12N 15/86* (2013.01); *C12Y 304/21022* (2013.01); *C12N 2750/14143* (2013.01)

(58) Field of Classification Search
None
See application file for complete search history.

(56) References Cited

U.S. PATENT DOCUMENTS

| | | | |
|---|---|---|---|
| 10,799,566 B2 | 10/2020 | High et al. | |
| 2010/0137211 A1 | 6/2010 | Monahan et al. | |
| 2020/0129598 A1 | 4/2020 | High et al. | |

FOREIGN PATENT DOCUMENTS

| | | |
|---|---|---|
| JP | 2018522529 A | 8/2018 |
| WO | 2020104480 A1 | 5/2020 |

OTHER PUBLICATIONS

Valentino (2010) "Blood-induced joint disease: the pathophysiology of hemophilic arthropathy", Journal of Thrombosis and haemostasis, 8(9): 1895-1902. (Year: 2010).*

Monahan, et al. (2015) "Employing a Gain-of-Function Factor IX Variant R338L to Advance the Efficacy and Safety of Hemophilia B Human Gene Therapy: Preclinical Evaluation Supporting an Ongoing Adeno-Associated Virus Clinical Trial", Human Gene Therapy, 26: 69-81. (Year: 2015).*

U.S. Appl. No. 18/508,998, Final Office Action, Mailed on Feb. 24, 2025, 19 pages.

Lavie et al., "The Human L1 Promoter: Variable Transcription Initiation Sites and a Major Impact of Upstream Flanking Sequence on Promoter Activity", Genome Research, vol. 14, No. 11, Nov. 2004, pp. 2253-2260.

U.S. Appl. No. 18/508,998, Non-Final Office Action, Mailed on Nov. 6, 2024, 16 pages.

Chang et al., "Changing Residue 338 in Human Factor IX From Arginine to Alanine Causes an Increase in Catalytic Activity", The Journal of Biological Chemistry, vol. 273, No. 20, May 1998, pp. 12089-12094.

EP22724758.2, "Communication Pursuant to Article 94(3) EPC", Mailed on Jan. 28, 2025, 4 pages.

Gao et al., "Chapter 16: Introducing Genes into Mammalian Cells: Viral Vectors", Molecular Cloning: a Laboratory Manual, Cold Spring Harbor Laboratory Press, Fourth Edition, vol. 2, 2012, 26 pages.

Graf, "Extended Half-Life Factor VIII and Factor IX Preparations", Transfusion Medicine and Hemotherapy, vol. 45, No. 2 Available online at: https://zlmsg.ch/wp-content/uploads/2019/04/2018_EHL_factors_Graf.pdf, Mar. 2018, 6 pages.

Kafri et al., "Sustained Expression of Genes Delivered Directly into Liver and Muscle by Lentiviral Vectors", Nature Genetics, vol. 17, No. 3, Nov. 1997, pp. 314-317.

Knobe et al., "Haemophilia and Joint Disease: Pathophysiology, Evaluation, and Management", Journal of Comorbidity, vol. 1, No. 1, Dec. 2011, pp. 51-59.

Kuijlaars et al., "Monitoring Joint Health in Haemophilia: Factors Associated with Deterioration", Haemophilia, vol. 23, No. 6, Nov. 2017, pp. 934-940.

Lin et al., "Generation of a Novel Factor IX with Augmented Clotting Activities in Vitro and in Vivo", Journal of Thrombosis and Haemostasis, vol. 8, No. 8, Aug. 2010, pp. 1773-1783.

Madsbad, "Insulin Analogues: Have They Changed Insulin Treatment and Improved Glycaemic Control?", Diabetes/Metabolism Research and Reviews, vol. 18, Supplement 1, Jan. 2002, pp. S21-S28.

(Continued)

*Primary Examiner* — Robert M Kelly
(74) *Attorney, Agent, or Firm* — Kilpatrick Townsend & Stockton LLP

(57) ABSTRACT

The invention relates to a gene therapy vehicle for use in preventing, arresting and/or treating hemophilic arthropathy of a joint in a patient having hemophilia B, where the gene therapy vehicle comprises a nucleic acid that encodes a coagulation factor having Factor IX activity.

17 Claims, 10 Drawing Sheets

Specification includes a Sequence Listing.

(56) References Cited

OTHER PUBLICATIONS

Miesbach et al., "Gene Therapy With Adeno-associated Virus Vector 5-human Factor IX in Adults With Hemophilia B", Blood, The Journal of the American Society of Hematology, vol. 131, No. 9, Mar. 1, 2018, pp. 1022-1031.
Monahan et al., "Employing a Gain-of-Function Factor IX Variant R338L to Advance the Efficacy and Safety of Hemophilia B Human Gene Therapy: Preclinical Evaluation Supporting an Ongoing Adeno-Associated Virus Clinical Trial", Human Gene Therapy, vol. 26, No. 2, Feb. 1, 2015, pp. 69-81.
Nair et al., "Gene Therapy for Hemophilia B Using CB 2679d-GT: A Novel Factor IX Variant with Higher Potency than Factor IX Padua", Blood, The Journal of the American Society of Hematology, vol. 37, No. 21, May 27, 2021, pp. 2902-2906.
Nathwani et al., "Self-Complementary Adeno-Associated Virus Vectors Containing a Novel Liver-Specific Human Factor IX Expression Cassette Enable Highly Efficient Transduction of Murine and Nonhuman Primate Liver", Blood, vol. 107, No. 7, Apr. 1, 2006, pp. 2653-2661.
Nichols et al., "Preclinical Evaluation of a Next-generation, Subcutaneously Administered, Coagulation Factor IX Variant, Dalcinonacog Alfa", Public Library of Science One, vol. 15, No. 10, Oct. 28, 2020, pp. 1-12.
Application No. PCT/EP2022/060774, International Search Report and Written Opinion, Mailed on Sep. 27, 2022, 13 pages.
Samelson-Jones et al., "Evolutionary Insights into Coagulation Factor IX Padua and other High-Specific-Activity Variants", Blood Advance, vol. 5, No. 5, Mar. 9, 2021, pp. 1324-1332.
Santagostino et al., "Long-Acting Recombinant Coagulation Factor IX Albumin Fusion Protein (rIX-FP) in Hemophilia B: Results of a Phase 3 Trial", Blood, The Journal of the American Society of Hematology, vol. 127, No. 14, Apr. 7, 2016, pp. 1761-1769.
Schmidt et al., "Structure-Function Relationships in Factor IX and Factor IXa", Trends in Cardiovascular Medicine, vol. 13, No. 1, Jan. 2003, pp. 39-45.
Simioni et al., "X-Linked Thrombophilia with a Mutant Factor IX (Factor IX Padua)", The New England Journal of Medicine, vol. 361, No. 17, Oct. 22, 2009, pp. 1671-1675.
Spronck et al., "Enhanced Factor IX Activity Following Administration of AAV5-R338L "Padua" Factor IX Versus AAV5 WT Human Factor IX in NHPs", Molecular Therapy-Methods & Clinical Development, vol. 15, Dec. 2019, pp. 221-231.
Srivastava et al., "WFH Guidelines for the Management of Hemophilia", Haemophilia, vol. 19, 2013, pp. e1-e47.
Sun et al., "Intraarticular Factor IX Protein or Gene Replacement Protects Against Development of Hemophilic Synovitis in the Absence of Circulating Factor IX", Blood, vol. 112, No. 12, Dec. 1, 2008, pp. 4532-4541.
Urabe et al., "Scalable Generation of High-Titer Recombinant Adeno-Associated Virus Type 5 in Insect Cells", Journal of Virology, vol. 80, No. 4, Feb. 2006, pp. 1874-1885.
Wang et al., "Adeno-Associated Virus Vector as a Platform for Gene Therapy Delivery", Nature Reviews Drug Discovery, vol. 18, May 2019, pp. 358-378.
Wright, "Codon Modification and PAMPs in Clinical AAV Vectors: The Tortoise or the Hare?", Molecular Therapy, vol. 28, No. 3, Mar. 2020, pp. 701-703.
Wu et al., "Factor IX Alteration p.Arg338Gln (FIX Shanghai) Potentiates FIX Clotting Activity and Causes Thrombosis", Haematologica, vol. 106, No. 1, Jan. 2021, pp. 264-268.
Young et al., "Nonacog Beta Pegol (N9-GP) in Haemophilia B: A Multinational Phase III Safety and Efficacy Extension Trial (Paradigm™ 4)", Thrombosis Research, vol. 141, May 2016, pp. 69-76.
Nathwani et al., "Long-term safety and efficacy of factor IX gene therapy in hemophilia B.", New England Journal of Medicine 371.21 (2014), Nov. 20, 2014, 17 pages.
Doshi et al., "Gene Therapy for Hemophilia: What Does the Future Hold?", Therapeutic Advances in Hematology, vol. 9, No. 9, Aug. 27, 2018, pp. 273-293.
Nair et al., "Computationally Designed Liver-Specific Transcriptional Modules and Hyperactive Factor IX Improve Hepatic Gene Therapy", Blood, vol. 123, No. 20, May 15, 2014, pp. 3195-3199.
JP 2023-564521, "Office Action", Mar. 19, 2024, 6 pages.
Sun et al., "Chinese hemophilia joint health score 2.1 reliability study", Haemophilia 20.3, 2014, 435-440.

* cited by examiner

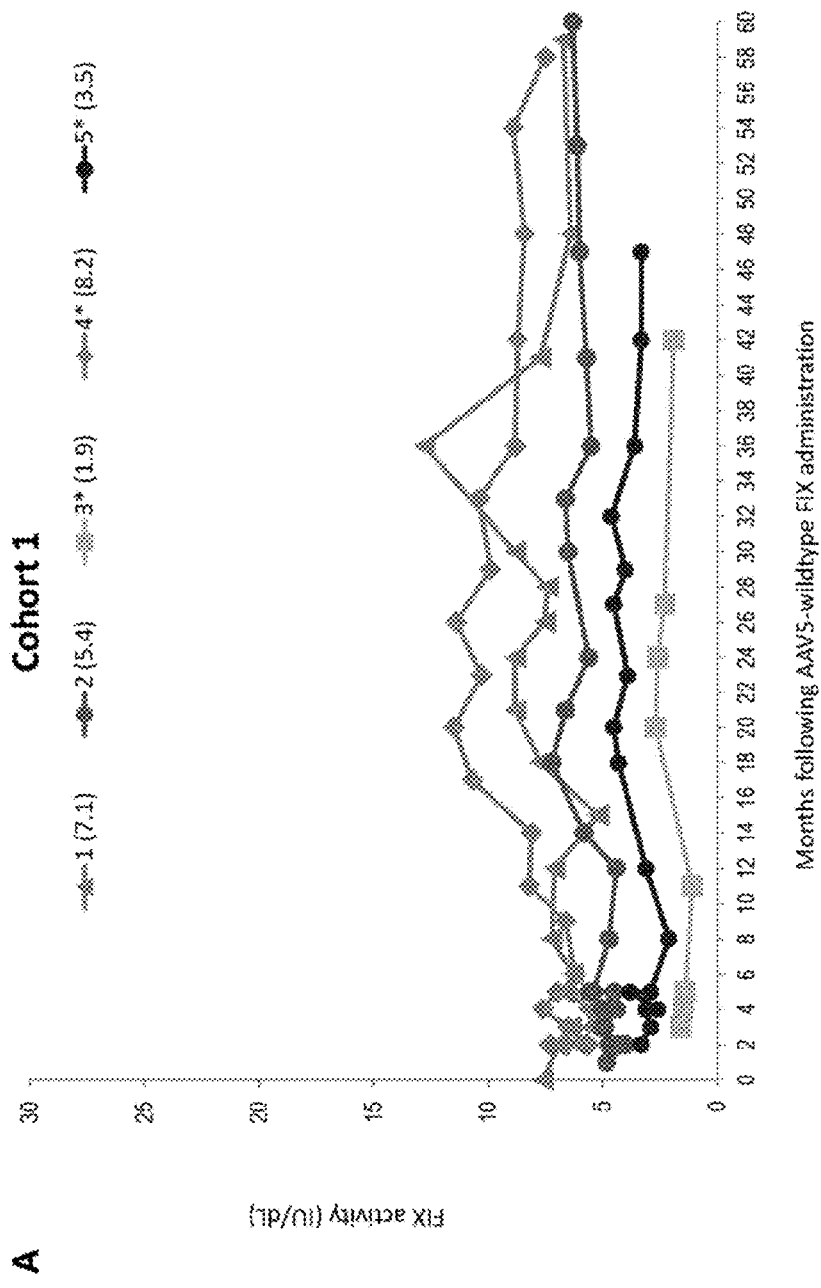
Figure 1. Sustained increases in FIX activity following AAV5-wildtypeFIX administration.
Figure 1 (1/2)

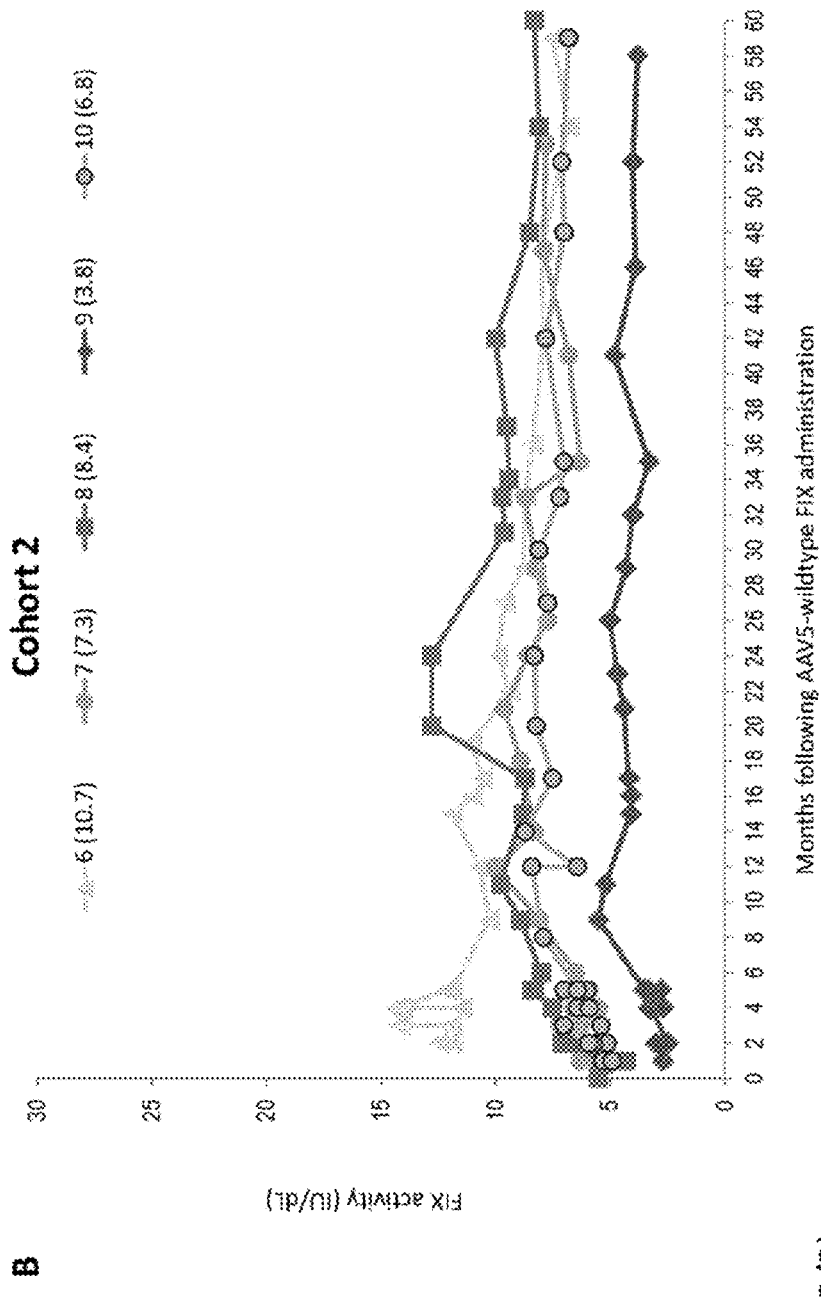
Figure 1. Sustained increases in FIX activity following AAV5-wildtypeFIX administration.
Figure 1 con. (2/2)

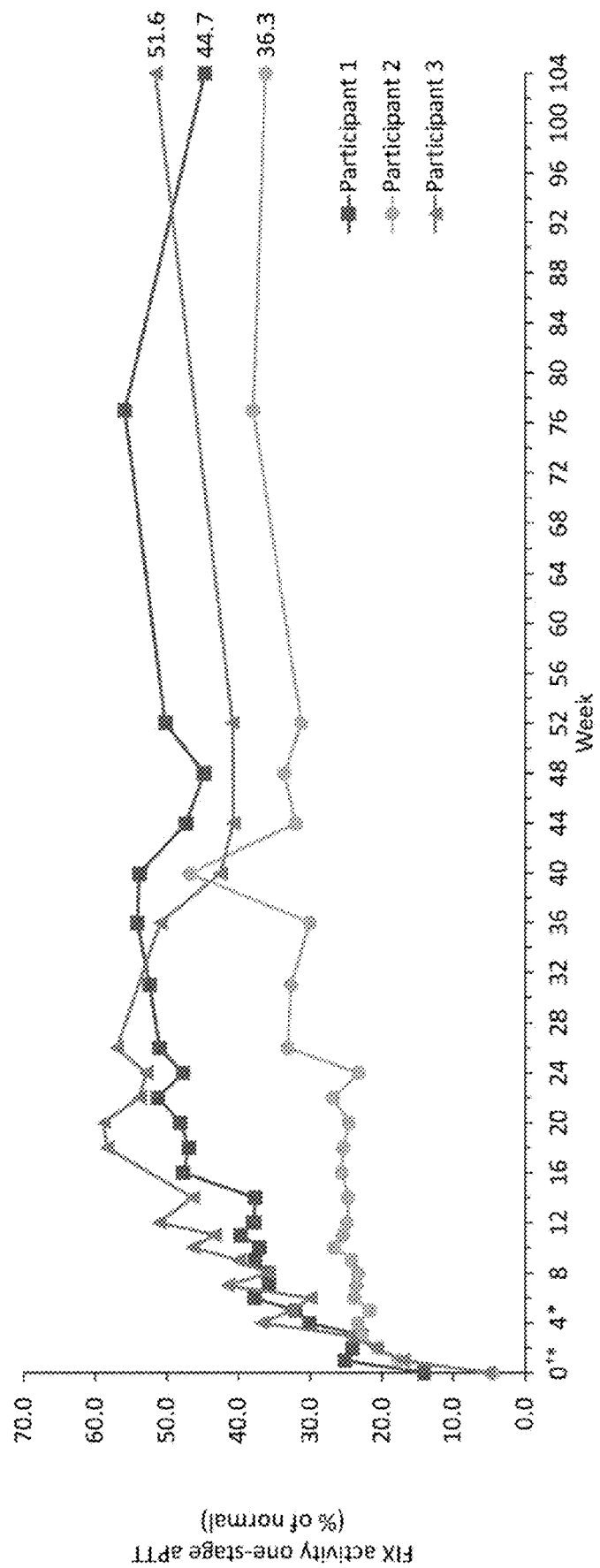
Figure 2. Sustained increases in FIX activity following AAV5-PaduaFIX administration.

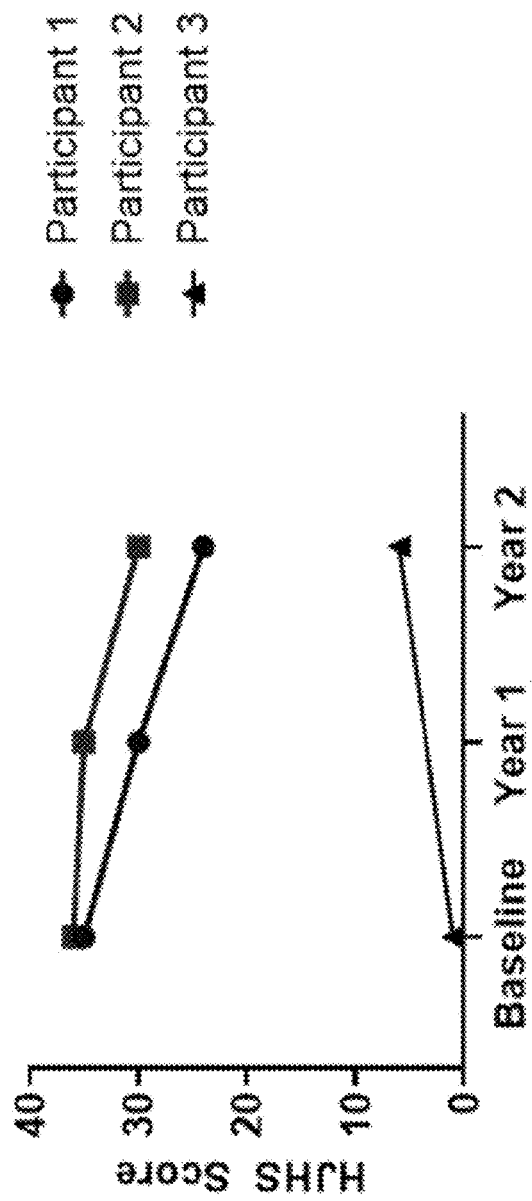
Figure 3. Joint Health Scores (HJHS 2.1) following AAV5-PaduaFIX administration.

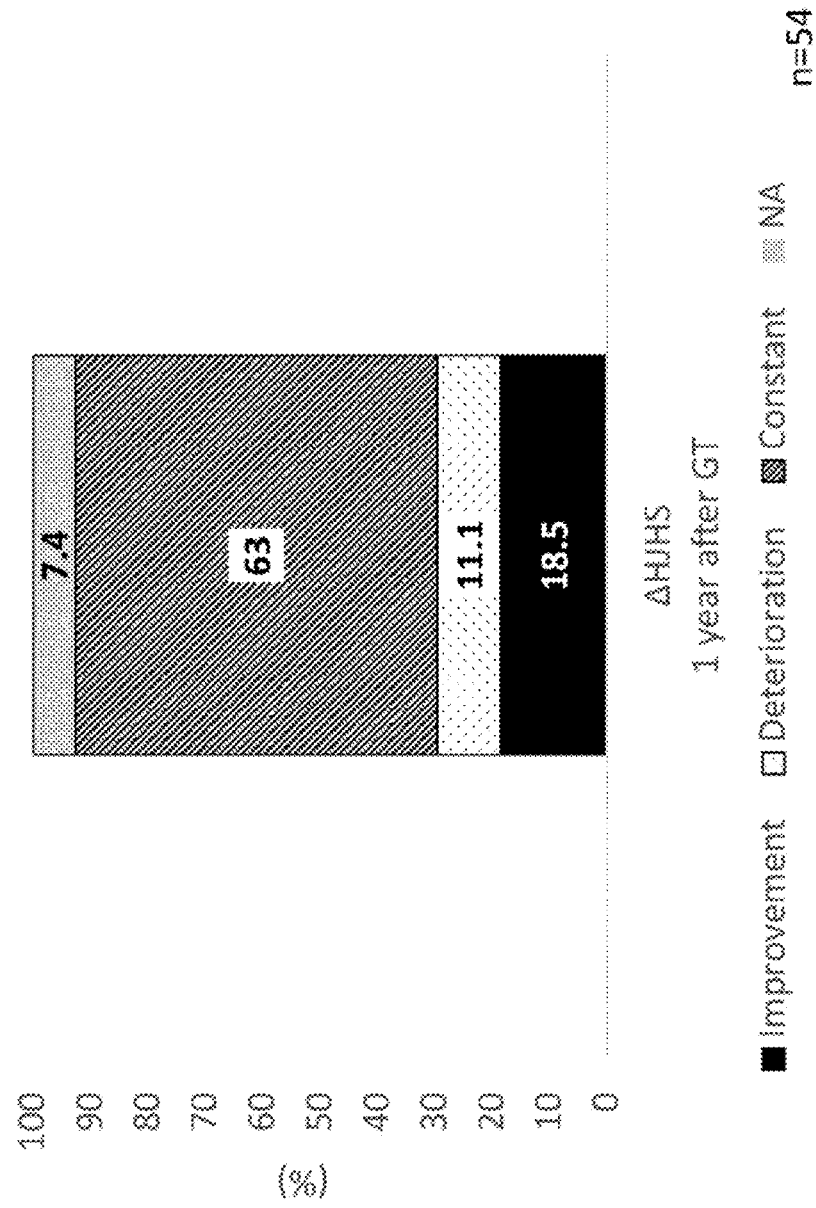
Figure 4. Change in Joint Health Scores (ΔHJHS 2.1) after 1 year following AAV5-PaduaFIX administration.
Figure 4 (1/2)

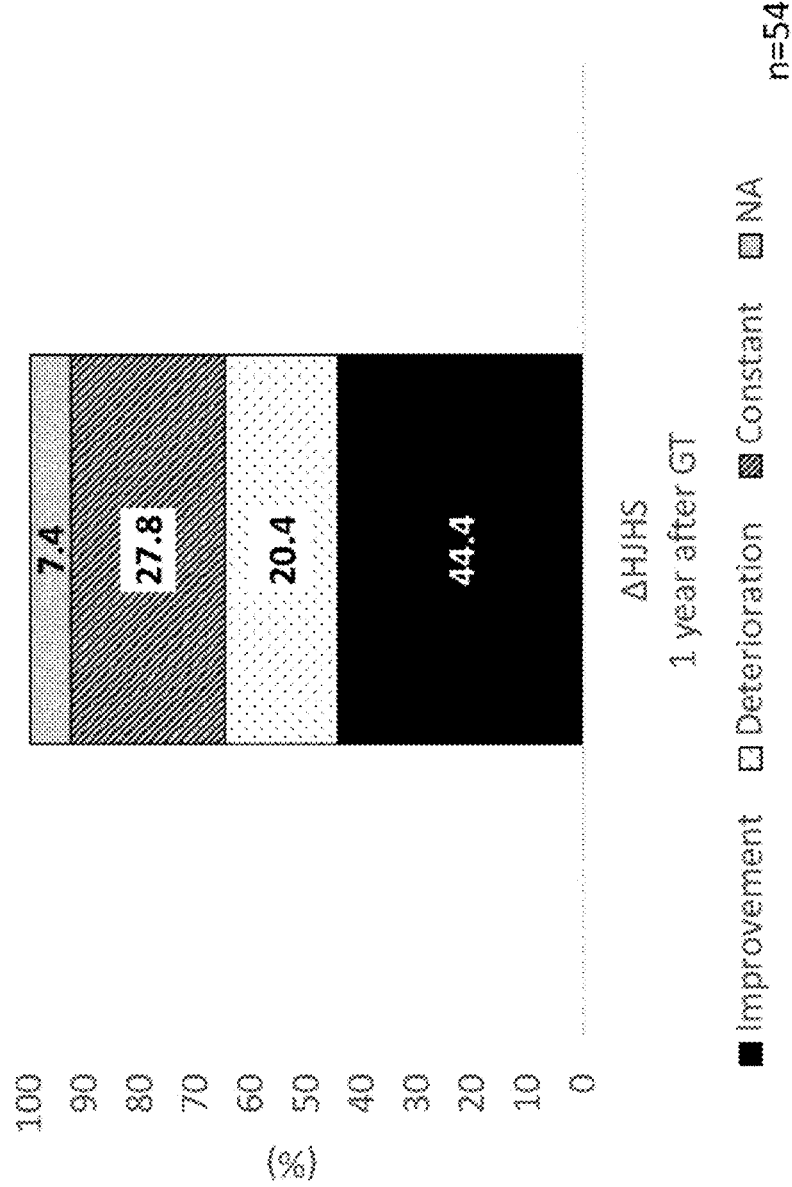
Figure 4. Change in Joint Health Scores (ΔHJHS 2.1) after 1 year following AAV5-PaduaFIX administration.
Figure 4 con. (2/2)

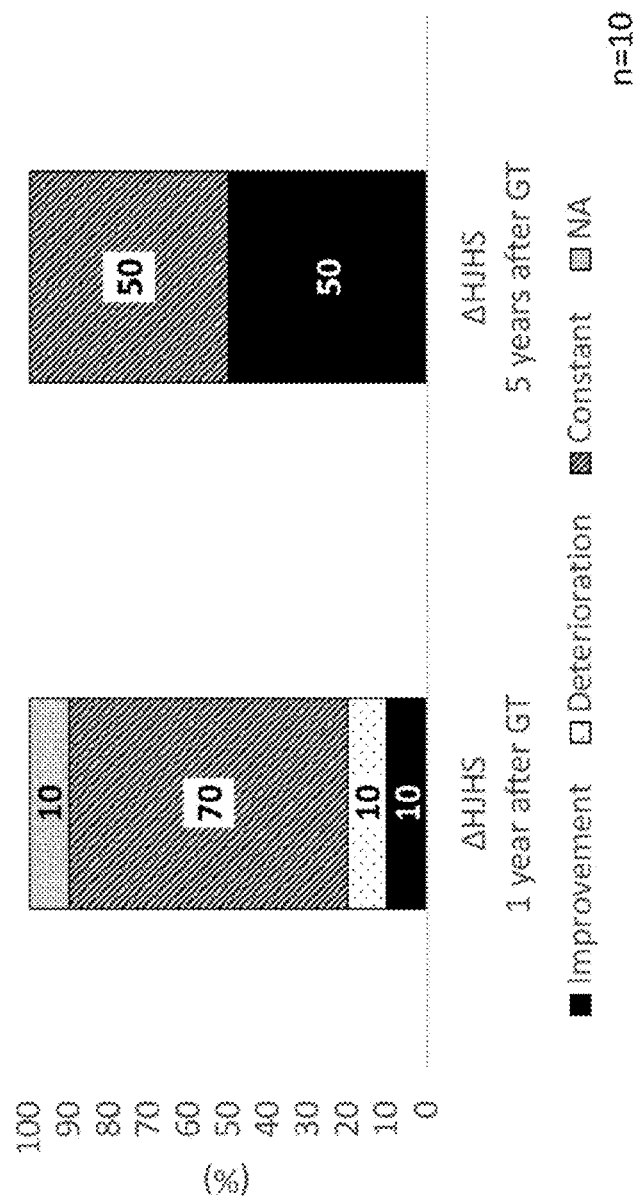
Figure 5. Change in Joint Health Scores (ΔHJHS 2.1) after 1 year and 5 years following AAV5-wildtypeFIX administration.
Figure 5 (1/2)

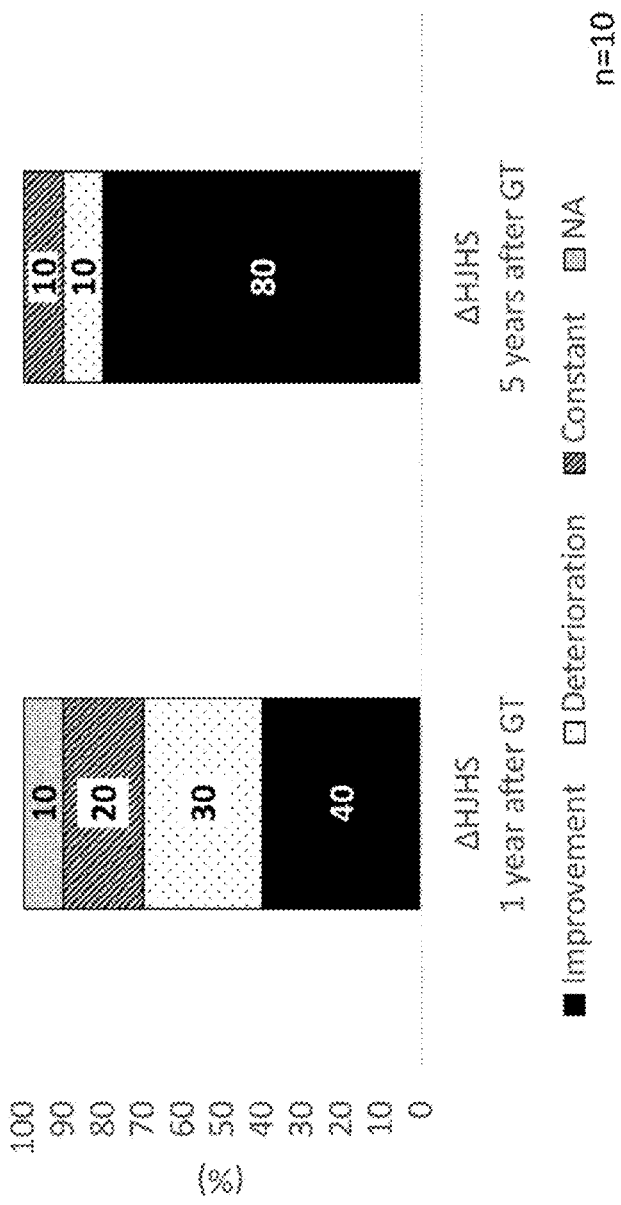
Figure 5. Change in Joint Health Scores (ΔHJHS 2.1) after 1 year and 5 years following AAV5-wildtypeFIX administration.
Figure 5 con. (2/2)

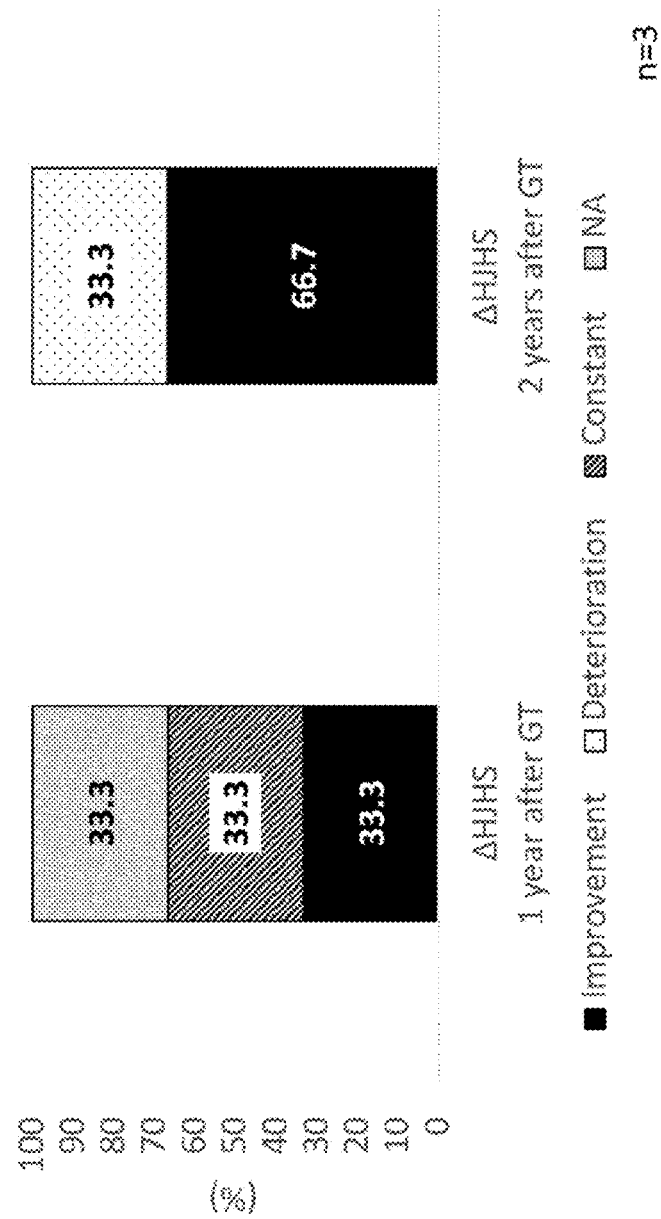
Figure 6. Change in Joint Health Scores (ΔHJHS 2.1) after 1 year and 2 years following AAV5-PaduaFIX administration.
Figure 6 (1/2)

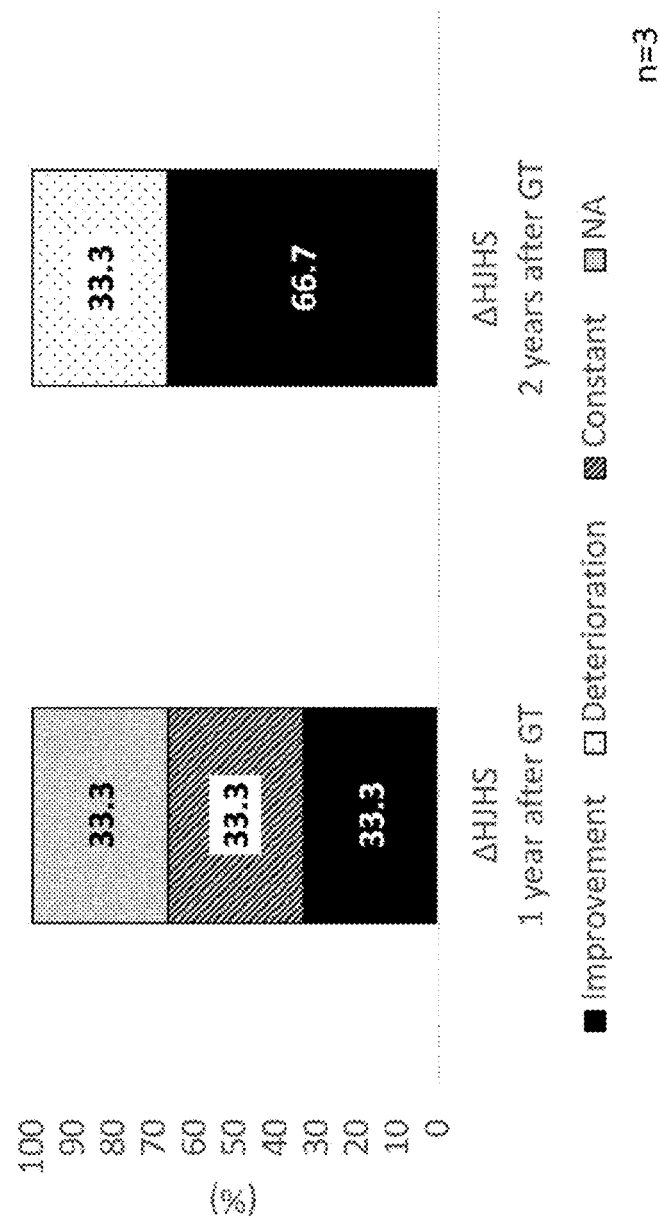
Figure 6. Change in Joint Health Scores (ΔHJHS 2.1) after 1 year and 2 years following AAV5-PaduaFIX administration.
Figure 6 con. (2/2)

METHODS AND MEANS FOR THE PREVENTION AND/OR TREATMENT OF HEMOPHILIC ARTHROPATHY IN HEMOPHILIA

CROSS REFERENCE TO RELATED APPLICATIONS

This application is a divisional of and claims priority to U.S. patent application Ser. No. 18/508,998 filed on Nov. 14, 2023 which is a continuation of U.S. patent application Ser. No. 18/556,163 filed on Oct. 19, 2023, which is a U.S. national phase of International Patent Application No. PCT/EP2022/060774, filed on Apr. 22, 2022, which claims the benefit of European Patent Application No. 21170264.2, filed on Apr. 23, 2021, each of which is incorporated herein by reference in its entirety.

SEQUENCE LISTING

The instant application contains a Sequence Listing in XML format. The Sequence Listing, named FIX 1415845.xml, which was created on May 13, 2024 is 4.46 Kilobytes in size, and is hereby incorporated by reference in its entirety.

FIELD OF THE INVENTION

The invention relates to the field of blood clotting disorders, generally known as hemophilia, and more specifically to preventing, arresting and/or treating hemophilic arthropathy in mild, moderate and/or severe Hemophilia patients.

BACKGROUND

Hemophilia in general is the result of a lack of a (functional) factor in the coagulation cascade, a complex and multifactorial sequence of enzymatic conversions eventually leading to the formation of a blood clot. Two well-known forms of hemophilia are known as hemophilia A and B respectively. Hemophilia A is caused by a lack of (functional) factor VIII, whereas hemophilia B is the result of a lack of (functional) factor IX. Both congenital diseases are single gene defects (although many different mutations in the genes encoding Factor VIII and Factor IX are known) and therefore have long been considered as "ideal" candidates for gene therapy approaches. Early attempts at gene therapy failed as they did not establish long term expression of the Factor correcting the genetic defect. At the present time, through improved delivery vehicles and vectors (in many respects such as codon usage, promoters, capsids, etc.) it seems that gene therapy for hemophilia is delivering on its promise to achieve correction of the genetic defect and eliminating or at least substantially diminishing the risk of bleeding episodes.

Mild, moderate, and severe disease are defined based on active clotting factor levels (Srivastava A et al, 2013).

Severe hemophilia B patients have a level of FIX activity <1 IU $dL^{-1}$ (<0.01 IU $mL^{-1}$) or <1% of normal. Those patients are characterized by spontaneous bleeding into joints or muscles, predominantly in the absence of identifiable hemostatic challenge.

Moderate hemophilia B patients have a level of FIX activity between 1-5 IU $dL^{-1}$ (0.01-0.05 IU $mL^{-1}$) or 1-5% of normal. Those patients are characterized by occasional spontaneous bleeding and/or prolonged bleeding with minor trauma or surgery.

Mild hemophilia B patients have a level of FIX activity between 5-40 IU $dL^{-1}$ (0.05-0.40 IU $mL^{-1}$) or 5 to <40% of normal. Those patients are characterized by severe bleeding with major trauma or surgery. Spontaneous bleeding is rare.

Although the risk of bleeding episodes is the main burden on hemophilia patients, even when this risk is under control, there are still deleterious effects for hemophilia patients. One of those effects is irreversible hemophilic arthropathy (joint damage). The present invention provides means and methods to ameliorate hemophilic arthropathy in hemophilia patients.

Hemophilic arthropathy, or joint damage, is a disabling and common complication of severe hemophilia, and although to a somewhat lesser extent, to moderate and mild hemophilia A or B, in which often a characteristic arthropathy develops as a result of recurrent bleeding into joints. In patients with hemophilia, these joint changes that may lead to arthropathy eventually may result in chronic arthropathy (Knabe K et al, 2011).

Hemophilic arthropathy may be caused by internal bleeding, for example intra-articular and intramuscular bleeding, in the joint, which occurs even when a patient is on protein prophylaxis therapy. Without being bound to any theory, the present inventors consider that hemophilic arthropathy in hemophilia can be arrested, or at least be slowed down by applying gene therapy carrying the missing and/or defect factor, wherein the gene therapy results in an essentially constant level of the correcting coagulation factor in the circulation of the patient. The present inventors believe (although they do not wish to be bound by theory) that the peaks and troughs found in regular protein replacement therapy are the root cause of the joint damage and that avoiding in particular these troughs prevents the internal joint bleeding that leads to hemophilic arthropathy. To achieve this effect it seems important that peaks and troughs of coagulation factor activity levels are flattened as much as possible. For all categories of hemophilia patients (severe, moderate and mild) the invention teaches that elevating the activity level to a less severe group (from severe to moderate, from moderate to mild and from mild to asymptomatic) can also alleviate at least some of the joint damage that otherwise occurs in hemophilia patients, if the enhanced activity levels are relatively constant and stay above the lower limit of the less severe variant of hemophilia B. Instead of activity levels one may also measure protein concentration levels in circulation. For wild type coagulation factors, especially wildtype FIX, and most coagulation factor variants, especially FIX variants, the correlation between concentration and activity is a given based on the intrinsic activity of the variant used.

SUMMARY OF THE INVENTION

According to the invention means and methods are provided to at least slow down the rate of progression of hemophilic arthropathy in hemophilia patients. It is preferred that the progress of hemophilic arthropathy is arrested. In some cases it may even be possible to reverse at least some of the damage and improve the health score of the joints of hemophilia patients. According to the invention the relevant coagulation factor is provided such that activity levels of the coagulation factor are relatively constant over time. This may be achieved by gene therapy and/or protein replacement therapy as discussed in more detail below. This invention particularly focuses on Factor IX and hemophilia B, but it is very well applicable to hemophilia A.

In one aspect, the invention provides a gene therapy vehicle for use in preventing, arresting and/or treating hemophilic arthropathy of a joint in hemophilia B patients, wherein said gene therapy vehicle comprises a nucleic acid that encodes a coagulation factor having Factor IX activity. It has been shown that long term steady expression of Factor IX may be achieved in this way. Preferably, the peaks and troughs are no more than 25% above or below the average activity levels, more preferably no more than 10% above or below the average activity levels.

Hemophilic arthropathy may lead to pain, loss of range of motion, and/or muscle atrophy resulting in loss of activities and restrictions in participation in society. For example, the hemophilic arthropathy may comprise joint bleeding and/or synovitis.

The patient having hemophilia B may be a mild, moderate, or severe hemophilia B patient. Preferably, the patient is a mild or moderate hemophilia B patient. For example, the patient is a moderate hemophilia B patient. For example, the patient may have a pre-treatment (baseline) level of Factor IX activity of less than 1 IU/dl, or from 1 to up to 5 IU/dl, or from 5 to up to 40 IU/dl. Preferably the patient has a pre-treatment (baseline) level of Factor IX activity of from 1 to up to 40 IU/dl, for example from 5 to up to 40 IU/dl.

According to the invention a gene delivery vehicle is a package that comprises a nucleic acid that encodes a protein of interest. The protein of interest according to the claims is Factor IX or a functional equivalent thereof. Factor VIII is equally contemplated. Gene therapy with Factor VIII may rely on a different viral delivery system because of the size of the gene of interest. Typically the viral vector for full length Factor VIII is retrovirus and in particular lentivirus based. However, it is well known that truncated Factor VIII variants may also be used, and will fit other viral delivery vectors such as AAV. In the following, the invention is described referring to Factor IX, and variants thereof, and AAV delivery in particular. The same methods and means are available for Factor VIII, for example Factor VIII in the lentiviral context.

According to the invention as claimed, the coagulation factor has Factor IX activity. Typically the coagulation factor for use according to the invention is Factor IX or a functional equivalent thereof for use in hemophilia B. Functional equivalents have essentially the same function (in kind, not necessarily in amount) in the coagulation cascade as the wildtype coagulation factor. In fact hyperactive mutants are preferred, since the essentially steady state activity levels that are preferred according to the invention are more readily achieved with such hyperactive mutants. The essentially steady state is defined as an activity level that remains essentially above the dividing line between two severity levels (severe, moderate, mild) and that varies less than 25% of the average level over time. Preferably the activity is more that 25% over the dividing line. Preferably the deviation from the average is less than 10%.

The package for gene therapy may be a non-viral vehicle, such as DNA/Cationic lipid (lipoplexes) including liposomes and/or exosomes, or DNA/Cationic polymer (Polyplexes) or DNA/Cationic polymer/cationic lipid (lipipolyplexes), or are inorganic particles such as engineered nanoparticles that can vary in size, shape and porosity to protect an entrapped molecule from degradation. In particular embodiments, the gene therapy vehicle is a lentiviral- or parvoviral based particle or vector. Lentiviral vectors for expression of FVIII gene are known in the art, see Kafri T et al, 1997.

In some embodiments, the package for gene therapy may be of viral origin. In a preferred embodiment, the parvoviral based particle is an adeno associated virus (AAV) based particle or vector, preferably a recombinant AAV (rAAV) based particle or vector. Most preferably an AAV5 particle. AAV is a proven vehicle for gene therapy (Wang D et al, 2019) that has no known pathology associated with it, infects human cells reasonably well and has no serious immunogenicity issues.

An AAV vector is preferred for a nucleic acid that encodes a coagulation factor having Factor IX activity. A lentiviral vector might be preferred for a nucleic acid that encodes a full length coagulation factor having Factor VIII activity, because of its larger capacity to accommodate a gene sequence with a bigger size in kb (kilo-base pair, as length measurement unit). However, AAV vectors carrying a nucleic acid encoding for a truncated form of Factor VIII are also preferred.

Adena-associated virus (AAV) is a small (approximately 25 nm in diameter), non-enveloped, icosahedral, non-pathogenic parvovirus (Wang D et al, 2019). AAV infect cells through a receptor mediated process, after which the viral DNA is transported to the nucleus. AAV needs a helper virus, such as adenovirus or herpes virus, to replicate. Wild-type AAV has a linear single-stranded DNA genome that is approximately 4.7 kilobase (kb) long. The genome consists of two coding elements: the replicase (rep) gene (encoding rep78, rep68, rep52 and rep40) encoding replicases (Rep proteins) required for AAV replication and packaging, and the capsid (cap) gene encoding the capsid proteins (VP1, VP2, and VP3).

In further particular embodiments, AAV vectors include capsids derived from AAV1, AAV2, AAV3, AAV4, AAV5, AAV6, AAV7, AAV8, AAV9, AAVrh10, AAV11, as well as variants (e.g., capsid variants with amino acid insertions, additions and substitutions, or hybrid capsids) thereof. AAV capsids typically include a VP1 protein and two shorter proteins, called VP2 and VP3, that are essentially amino-terminal truncations of VP1. The three capsid proteins VP1, VP2 and VP3 are typically present in a capsid at a ratio approximating 1:1:10, respectively, although this ratio, particularly of VP3, can vary significantly and should not to be considered a limitation.

The genome of wildtype AAV is typically flanked by two inverted terminal repeats (ITRs), which serve as substrates for the Rep proteins during replication and packaging of the vector genome. The vector genome consists of either a positive (+) or a negative (−) strand. The vector genome is packaged into capsids composed of the three viral proteins, VP1, VP2, and VP3. Each capsid consists of 60 individual proteins, approximately 80% of which are VP3. For gene therapy purposes, AAV is typically produced recombinantly and the wildtype vector genome is typically replaced by a gene of interest. In addition, typically elements necessary for expression are also present, such as a promoter sequence, a poly A tail, stuffers, intrans and/or further elements.

Recombinant AAV (rAAV) production methods might involve mammalian or insect cell systems (Wang D et al, 2019; Gao G & Sena-Esteves M, 2012; Urabe M et al, 2006).

Preferably, the gene therapy vehicle of the invention comprises a viral vector, for example an AAV based particle.

The gene of interest can be packaged in AAV capsids by placing it between two ITR's of parvoviral origin. These ITRs may be from the same serotype as the capsid, but also of different origin. The examples herein disclose a combination of an AAV5 capsid with AAV2 ITRs. Other hybrids are also embodiments of the present invention. Such hybrids include combinations of different serotypes for capsid and ITRs, but also capsid elements from different serotypes, possibly with yet other ITRs.

The dosage of rAAV to be given to a patient will depend on the vehicle, the gene of interest, and/or the route of administration. Typically, for i.v. administration dosages will range from $8 \times 10^{10}$ vg/kg to $5 \times 10^{13}$ vg/kg.

The dose will depend on several factors, such as the serotype used (preferred serotypes are AAV5, AAV8, AAV9, AAVrh10, AAV10, AAV6 and hybrids comprising capsid elements of these serotypes, e.g. AAV2/8). The importance of the capsid choice is mainly immunogenicity and/or infection efficacy of the target cells. As explained herein before, the internal parts of the AAV gene delivery vehicle may be from a different serotype as the outside. The ITRs in particular may be derived from a different serotype such as AAV2.

According to the invention, the AAV based particle may be an AAV5 particle.

The nucleic acid sequence, packaged in the AAV vector, i.e. the vector genome, comprises a nucleic acid sequence that encodes a coagulation factor. This sequence is preferably codon-optimized, for example, by reducing the number of CpG (cytosine-guanine) di-nucleotides compared to the human wild-type sequence encoding the human FIX (Wright J F, 2020) or by substituting the original codons with tissue-specific ones. Other forms of codon optimization are also possible. Generally, it is believed that (tissue specific) codon optimization can result in improved expression levels of the transgene. In the art, many algorithms are known to achieve codon optimization.

The nucleic acid sequence encoding a coagulation factor may comprise a Factor IX (FIX) protein. FIX is a vitamin K-dependent protein that is synthesized by hepatocytes as a precursor of a serine protease, FIXa. The gene for FIX consists of eight exons and seven intrans, is approximately 34 kb long, and is located on the long arm of the X chromosome at Xq27.1 (reviewed in Thompson 2001). It is synthesized as a precursor protein of 461 amino acids containing a 28-residue signal prepeptide and an 18-residue leader propeptide. The resulting mature protein is a single chain of 415 residues. Structurally, FIX contains an N-terminal Gia domain (residues 1-40), a short hydrophobic stack (residues 41-46), two epidermal growth factor (EGF)-like domains (EGF1: residues 47-83, and EGF2: residues 88-127, which are connected by linker residues 84-87), an activation peptide (residues 146-180), and a C terminal protease domain (residues 181-415) (Schmidt A E et al, 2003).

Said gene therapy vehicle comprising a nucleic acid encoding for coagulation factor IX is used for treating Hemophilia B disease.

In some embodiments, the FIX protein is wild type, and in other embodiments, the FIX protein is a mutant that contains at least a single amino acid substitution that alters the protein's coagulation activity. In embodiments according to the invention, such substitution or substitutions produces a hyperactive mutant with increased FIX coagulant. Hyperactive variants of the coagulation factor are preferred (Samelson-Jones B J et al, 2021). In case of Factor IX these variants include R338L (Padua), R338Q and the FIX variant CB 2679d-GT (R318Y, R338E, T343R). Less active variants such as R338A, R338E or the FIX-Triple A (V86A/E277A/R338A) are also useful in the gene therapy vehicle according to the present invention. R338L is disclosed in Simioni P et al, 2009; R338Q is disclosed in Simioni P et al, 2009 and in Wu W et al, 2021; the CB 2679d-GT (R318Y/R338E/T343R) is disclosed in Nair N et al, 2021; R338E is disclosed in Nichols T C et al, 2020; the FIX-Triple A (V86A/E277A/R338A) is disclosed in Lin C N et al, 2010; R338A is disclosed in Chang J et al, 1998.

Preferably, the nucleic acid comprises a hyperactive variant, such as FIX R338L. FIX-R338L will also be referred to as R338L, 338L, FIX Padua, FIX-Padua, Padua-FIX, Padua-FIX or simply Padua.

The sequence of wildtype Factor IX as well as of preferred hyperactive variants is given below:

```
Mature FIX
                                              SEQ ID NO: 1
   1 YNSGKLEEFV QGNLERECME EKCSFEEARE

VFENTERTTE FWKQYVDGDQ

51 CESNPCLNGG SCKDDINSYE CWCPFGFEGK

NCELDXTCNI KNGRCEQFCK

101 NSADNKVVCS CTEGYRLAEN QKSCEPAVPF

PCGRVSVSQT SKLTRAEXVF

151 PDVDYVNSTE AETILDNITQ STQSFNDFTR

VVGGEDAKPG QFPWQVVLNG

201 KVDAFCGGSI VNEKWIVTAA HCVETGVKIT

WVAGEHNIEE TEHTEQKRNV

251 IRIIPHHNYN AAINKYNHDI ALLELDXPLV

LNSYVTPICI ADKEYTNIFL

301 KFGSGYVSGW GRVFHKGXSA LVLQYLRVPL

VDRATCLXST KFXIYNNMFC

351 AGFHEGGRDS CQGDSGGPHV TEVEGTSFLT

GIISWGEECA MKGKYGIYTK

401 VSRYVNWIKE KTKLT
```

At position 86, X can be V(wt) or A
At position 148, X can be A(wt) or T(wt)
At position 277, X can be E(wt) or A
At position 318, X can be R(wt) or Y
At position 338, X can be R(wt) or L or Q or E or A
At position 343, X can be T(wt) or R
with (wt) meaning wildtype.

The FIX protein used in the context of the present invention can comprise this sequence or can consist of this sequence.

In another embodiment, the gene therapy vehicle comprises a nucleic acid that encodes a coagulation factor having Factor VIII activity. The coagulation factor having Factor VIII activity can either be a wild-type human factor VIII or a modified human factor VIII. Said gene therapy vehicle is used to treat Hemophilia A disease.

The nucleic acid, as described above, may further comprise elements, such as a promoter/enhancer, an intron, and a poly-A tail, wherein said elements may be present between two Inverted Terminal Repeat (ITR)s, especially in case of an AAV gene therapy vehicle.

Said promoter/enhancer element may be selected from a group of liver-specific ones, comprising the human alpha 1-antitrypsin (hAAT) promoter, HCR-hAAT hybrid promoter and an apolipoprotein E promoter LP1, Q1 promoter, Q1-prime, C14 promoter, or promoters as described in WO2020/104424. Preferably, the promoter/enhancer element is LP1 as described in WO2006/036502.

The LP1 promoter/enhancer element which is preferred according to the invention comprises core liver-specific elements from the consecutive segments of the human apolipoprotein hepatic control region (HCR, base pairs 134 to 442 of GenBank record HSU32510) and the human alpha-1-antitrypsin (hAAT) gene promoter, including the 5' untranslated region (base pairs 1747 to 2001 of GenBank record K02212) (Nathwani A C et al, 2006). The liver is the target organ for gene therapy of hemophilia and therefore a liver specific promoter is preferred.

Said ITRs may typically be positioned at the left and right ends (i.e., 5' and 3' termini, respectively) of the vector genome. Each ITR may be separated from the remaining sequence by a nucleic acid sequence of variable length. Preferably, said ITRs, as described above, are selected from a group consisting of adeno-associated virus (AAV) ITR sequences. More preferably, said ITRs sequences comprise the AAV1, AAV2, AAV5, AAV6, or AAV8 ITRs sequences. Optionally, said two ITRs sequences comprise both AAV1, both AAV2, both AAV5, both AAV6, or both AAV8 ITRs sequences. Also optionally, said ITR sequence at the 5' end of said nucleic acid sequence differs from said ITR sequence at the 3' end of said nucleic acid sequence, wherein said ITR sequence is one selected from the AAV1, AAV2, AAV5, AAV6 or AAV8 ITRs sequences.

In some embodiments, the AAV vector is defined as "hybrid", meaning that the viral ITRs and viral capsid are from different AAV parvoviruses. The viral ITRs preferably are derived from AAV2, and the capsid is preferably derived from a different one, which typically would be AAV5.

According to the invention hemophilia patients that are at a low risk of bleeding events, but do sustain damage to the joints, will also benefit from the therapy according to the invention, since providing a higher (steady state) level of the coagulation factor needed, will prevent or diminish joint damage in these patients. This benefit will also be present in moderate and severe hemophilia patients.

According to the invention, the gene therapy vehicle is administered in a dose, in vector genomes/per kilogram of body weight (vg/kg), that ranges from $8 \times 10^{10}$ vg/kg to $5 \times 10^{13}$ vg/kg. The range is dependent on several factors including, but not limited to: the level expression required to achieve a steady level of activity with a therapeutic effect, any host immune response to the viral vector, a host immune response to the expressed protein, and the stability of the protein expressed. It is preferred that only a single dose be given. In certain circumstances a follow up dose may be necessary. In this case it is particularly important to take care of a possible immune response. This may be done by using a different serotype or in any other manner known to the skilled person. Preferred dosages range from $1 \times 10^{11}$ vg/kg, more preferably from $5 \times 10^{11}$ vg/kg, up to $5 \times 10^{12}$ vg/kg or up to $2 \times 10^{13}$ vg/kg.

Typically, gene therapy is given as a one-time dose, or a single dose. This means that over a prolonged period of time, a patient would be treated only once. Preferably, the prolonged period of time means at least 1 year, more preferably at least 5 years, at least 10 years, or at least 15 years. Most preferable, the prolonged period of time means the life-span of the patient.

Since the effect to be achieved by the invention is a more steady state of a higher level above the dividing line between the different severity stages as explained above, this effect need not necessarily be achieved by gene therapy. By choosing e.g. factor IX variants with different activities and/or half-life a steady state may also be achieved. Such techniques are well known in the diabetes field using insulin derivatives (Madsbad S, 2002). These effects may also be achieved with an infusion device (as also known from the diabetes field). Gene therapy that fails to reach the desired steady state level may also be supplemented in these ways.

Thus in further aspects the invention provides a coagulation factor for use in preventing, arresting and/or treating hemophilic arthropathy in mild, moderate and/or severe Hemophilia patients. In particular, the invention provides said use of a coagulation factor that has Factor IX activity or Factor VIII activity. More specifically, the invention provides a coagulation factor that has human Factor IX activity for use in preventing, arresting and/or treating hemophilic arthropathy in mild, moderate and/or severe Hemophilia B patients. In another aspect, the coagulation factor has Factor VIII activity, more particularly human Factor VIII activity and it is used in preventing, arresting and/or treating hemophilic arthropathy in mild, moderate and/or severe Hemophilia A patients. In a further embodiment, the coagulation factor having either Factor IX or Factor VIII activity has an increased half-life.

As said, by having a longer half-life, higher more steady state like levels are more readily achieved thus it is an aspect of the invention that said coagulation factor has an increased half-life. Longer half-life variants of coagulation factors are described in (Young G et al, 2016; Santagostino E et al, 2016; Graf L, 2018). The coagulation factor having an increased half-life may be a hyperactive variant in addition. The best way to achieve steady state levels is by having combinations of different half-lives in a composition. Such compositions are also part of the present invention. All protein compositions according to the invention may also be used to supplement a gene therapy treatment that has led to insufficient levels of activity for achieving a less severe form of hemophilia in the circulation of the patient.

In the course of the present invention, and as shown in the examples, the present inventors have surprisingly established that a gene therapy method for the treatment of hemophilia B, prevents, arrests and/or treats hemophilic arthropathy in such patients.

In some embodiments, the gene therapy vehicle for use in preventing, arresting and/or treating joint damage in mild, moderate and/or severe hemophilia patients, may be of non-viral origin.

The patient to be treated according to the invention is preferably a human.

According to some embodiments, a therapeutically effective dose of an AAV vector is one that is sufficient, when administered to a human subject with hemophilia B, to result in a steady-state level of the coagulation factor FIX activity that reduces hemophilia from severe to moderate or mild hemophilia. Said levels of activity should be maintained for a period of at least 2 or 3 years.

According to certain embodiments, a therapeutically effective dose of an AAV vector is the one that reduces or removes in a hemophilic human subject the need for recombinant human Factor IX replacement therapy.

In certain embodiments, a therapeutically effective dose of an AAV vector prevents or diminishes hemophilic arthropathy by reducing the severity and the frequency of joint bleeds in a hemophilic human patient.

The joint may be one or both elbows, one or both knees, one or both ankles, one or both shoulders, one or both hips, one or both wrists, one or more joints of the hand, one or more joints of the foot, or any combination thereof. Preferably, the joint is selected from the group consisting of one or both elbows, one or both knees, one or both ankles, and any combination thereof.

Joint health may be measured by the Hemophilia Joint Health Score (HJHS). HJHS version 2.1 (HJHS 2.1) is used in the present invention. The HJHS 2.1 consists of 8 item scores on joint level and a global gait score. Scores range from 0 to 20 per joint and a global gait score ranges from 0 to 4. Focusing on the elbows, knees and ankles, the total score of HJHS 2.1 ranges from 0 to 124 points. A higher score indicates worse joint health. Changes in joint health may be quantified using ΔHJHS 2.1. Typically, a baseline HJHS 2.1 score is obtained pre-treatment ($T_o$), and another HJHS 2.1 score is obtained at each follow up time ($T^1$, $T^2$, etc) post-treatment. ΔHJHS 2.1 is defined as HJHS 2.1 at the follow up time minus the baseline HJHS 2.1.

According to the invention, the patient has a ΔHJHS 2.1 of 0, or less than 0. Preferably, the patient has a ΔHJHS 2.1 of less than 0, less than −2, or, more preferably, less than −4. The follow up time may be 1 year, or 2 years, or 5 years, after the last administration of the gene therapy vehicle.

In yet another aspect, the invention further provides a pharmaceutical composition for use in preventing, arresting and/or treating hemophilic arthropathy of a joint in a patient having hemophilia B, wherein the pharmaceutical composition comprises a gene therapy vehicle according to the present invention. Said pharmaceutical composition allows for the administration of the gene therapy vehicle, which is preferably an AAV vector of the AAV5 serotype to the human patient. Such administration preferably comprises administration via the bloodstream, e.g. via intravenous infusion. Hence, preferably the pharmaceutical composition is in a form suitable for intravenous infusion. For example, the pharmaceutical composition may be a liquid but may also be e.g. a lyophilized formulation. Said liquid or solid may be subsequently combined with e.g. a solution for injection or infusion. Preferably, the pharmaceutical composition is administered in a single dose.

In yet another aspect, the invention further provides a method for preventing, arresting and/or treating hemophilic arthropathy of a joint in a patient having hemophilia B, comprising administering to the patient an effective amount of a gene therapy vehicle according to the present invention, or an effective amount of a pharmaceutical composition according to the present invention.

In one embodiment of the invention, the method reduces the patient's HJHS 2.1 score by at least 0, preferably by at least 2, more preferably by at least 4, points. In one embodiment of the invention, the reduction of the HJHS 2.1 score occurs at least 1 year, or at least 2 years, or at least 5 years, after the administration of the gene therapy vehicle.

All embodiments and features described above with respect to one aspect of the invention also apply to other aspects of the invention.

TABLE AND FIGURE LEGENDS

Table 1. FIX protein Concentration % mean steady state following AAV5-wildtype FIX administration. Values of <1.23 were set to 1.23 for the calculation of summary statistics. Contaminated values were excluded in the calculation Additional/unscheduled visits are included in the calculation of the mean. Values were obtained post exogenous FIX tapering. Cl, Confidence Interval. *Participants 1, 2 and 9 are presumed cross-reactive matter positive (CRM+).

Table 2. Joint Health h Scores Joint (HJHS) following AAV5-wildtypeFIX administration. HJHS status was evaluated using the hemophilia Joint Health Score version 2.1. SD, standard deviation; N, number of participants.

FIG. 1. Sustained increase in FIX activity following AAV5-wildtypeFIX administration over 5 years. FIX activity was measured using a one-stage activated partial thromboplastin time-based assay. Only values at least 10-day after last FIX concentrate administration are included. FIX prophylaxis was continued after the infusion of AAV5-widetypeFIX and tapered between Weeks 6 and 12. *Patients 3, 4 and 5 retrospectively tested positive for AAV5 neutralizing antibodies using the luciferase-based assay. Patient 5 was unable to attend 4.5 yr follow-up visit due to COVID-19 and 5 yr follow-up blood sample was obtained within 10 days of exogenous FIX use for bleed and therefore excluded per protocol.

FIG. 2. Sustained increases in FIX activity following AAV5-PaduaFIX administration. FIX activity measured using a one-stage activated partial thromboplastin time-based assay. The week 0 time point reflects FIX activity before AAV5-PaduaFIX treatment. Samples from administration up to week 2 may include activity from exogenous FIX replacement. Data labels represent the percentage of normal FIX activity at week 104 for each participant.

FIG. 3. Joint Health Scores following AAV5-PaduaFIX administration (according to HJHS 2.1).

FIG. 4. Change in Joint Health Scores (ΔHJHS 2.1) after 1 year following AAV5-PaduaFIX administration. In FIG. 4a, it is considered an improvement of the joint health when ΔHJHS 2.1≥−4, a deterioration when ΔHJHS 2.1≥4, constant when ΔHJHS 2.1 is from −3 to 3, and NA when HJHS 2.1 score is not available. In FIG. 4b it is considered an improvement of the joint health when ΔHJHS 2.1<0, a deterioration when ΔHJHS 2.1>0, constant when ΔHJHS 2.1=0, and NA when HJHS 2.1 score is not available.

FIG. 5. Change in Joint Health Scores (ΔHJHS 2.1) after 1 year and 5 years following AAV5-wildtypeFIX administration. In FIG. 5a, it is considered an improvement of the joint health when ΔHJHS 2.1≥−4, a deterioration when ΔHJHS 2.1≥4, constant when ΔHJHS 2.1 is from −3 to 3, and NA when HJHS 2.1 score is not available. In FIG. 5b it is considered an improvement of the joint health when ΔHJHS 2.1<0, a deterioration when ΔHJHS 2.1>0, constant when ΔHJHS 2.1=0, and NA when HJHS 2.1 score is not available.

FIG. 6. Change in Joint Health Scores (ΔHJHS 2.1) after 1 year and 2 years following AAV5-PaduaFIX administration. In FIG. 6a, it is considered an improvement of the joint health when ΔHJHS 2.1 −4, a deterioration when ΔHJHS 2.1 4, constant when ΔHJHS 2.1 is from −3 to 3, and NA when HJHS 2.1 score is not available. In FIG. 6b it is considered an improvement of the joint health when ΔHJHS 2.1<0, a deterioration when ΔHJHS 2.1>0, constant when ΔHJHS 2.1=0, and NA when HJHS 2.1 score is not available.

EXAMPLES

Example 1

This example describes the 5 years efficacy outcome on FIX protein levels and the assessment of joint health in a phase 1/11 clinical trial.

In this trial, 10 adult hemophilia B subjects with FIX activity≤2 IU/dl received a single intravenous infusion of an adeno-associated virus serotype 5 (AAV5) vector encoding a codon-optimized wild-type human factor IX (FIX) gene driven by a liver-specific promoter. 5 subjects received $5 \times 10^{12}$ vg/kg (Cohort 1) and the other 5 received $2 \times 10^{13}$ vg/kg (Cohort 2).

FIX protein levels were estimated using an ELISA (Spronck E A et al, 2019). Joint health was assessed using the Hemophilia Joint Health Score (HJHS) version 2.1. (Kuijlaars I et al, 2017).

At 4 years after infusion, the mean FIX protein concentrations also confirm the persistent transgene expression; these data are largely consistent with FIX activity and vary between 1.37% and 10.71% in 7 of the 10 study participants. The mean average FIX antigen to activity ratio was 0.85 (SD 0.28) in 7 participants. The remaining 3 patients (who are presumed to be cross-reactive material positive) had FIX antigen to activity ratios of 9.28, 2.42, and 25.56, see Table 1.

At 5 year after infusion, the mean endogenous FIX activity in the lower-dose cohort (Cohort 1) is 5.2% and in the higher-dose cohort (Cohort 2) is 7.4%, see FIG. 1.

The overall joint health in cohort 1 improves with a decrease from a mean baseline score of 24.4 (SD 17.5) to 19.2 (SD 15.0) by 5 years, see Table 2. In the higher-dose cohort (cohort 2), the overall joint health also sees some improvement, with the mean score decreasing from 6.8 (SD 6.5) to 4.4 (SD 5). An increase in total HJHS score of 4 has been defined as joint deterioration (Kuijlaars I et al, 2017).

In conclusion, the transgene expression was sustained for 5 years. Joint health assessment scores improved by approximately 21% and 35% in cohorts 1 and 2, respectively.

Example 2

This example describes the 2 years efficacy outcome on FIX activity levels and the assessment of joint health in a phase 1/11 clinical trial. In this trial, 3 adult hemophilia B subjects received a single intravenous dose, $2 \times 10^{13}$ vg/kg of an adeno-associated virus serotype 5 (AAV5) vector containing a codon-optimized Padua variant human factor IX (Padua-FIX) gene with a liver-specific promoter. All participants had severe or moderate-severe FIX deficiency with FIX activity≤2%.

FIX activity was assessed using a one-stage activated partial thromboplastin time (aPTT) based assay and a chromogenic assay. FIX activity was measured using a one-stage activated partial thromboplastin time (aPTT) based assay and a chromogenic assay (Spronck E A et al, 2019).

Joint health was assessed at baseline and annually thereafter as part of long-term follow-up, using the hemophilia joint health score (HJHS) version 2.1 (Kuijlaars I et al, 2017).

At 2 years, the mean value of endogenous FIX activity was 44.2% (min-max, 36.3% 51.6%) (FIG. 2). Participants 1 and 3 maintained FIX activity in the non-hemophilic hemophilic range (≥40%). Participant 2 maintained FIX activity in the high-mild range. The measured FIX activity at two years (estimated using the one-stage a PTT-based assay) was 10.2-fold higher than the level of FIX antigen.

Total joint health scores decreased from baseline (35, 36, and 1 for participants 1-3, respectively) for 2 out of 3 participants when compared with scores at 2 years (24, 30, and 6, respectively) following vector infusion. Participant 3, who had a low baseline score of 1, had an increased score of 6 at 2 years post-treatment, see FIG. 3. An increase in total HJHS of ≥4 is indicative of joint degeneration (Kuijlaars I et al, 2017).

In conclusion, it is shown that the patients that were treated with a single infusion of AAV5-Padua-FIX resulted in stable and durable increases in FIX activity. Joint health improved in participants 1 and 2, showing a decrease in total joint score (from baseline to year 2 of follow-up) of 11 and 6, respectively. Participant 3 had an increase of 5 (total HJHS score) over the study period. However, this patient had worsening avascular hip necrosis, which required two surgeries over the two years of follow-up.

Example 3

This Example illustrates improvements in joint health in hemophilia B patients receiving the gene therapy vehicle according to the invention in phase II/III clinical trials. Each patients received a single intravenous dose, $5 \times 10^{12}$ or $2 \times 10^{13}$ vg/kg of an adeno-associated virus serotype 5 (AAV5) vector containing the relevant FIX gene with a liver-specific promoter. HJHS 2.1 scores were obtained at $T_0$ baseline (pre-treatment), and $T_1$ (1 year, 2 years, or 5 years following the administration). A ΔHJHS 2.1 is defined as the HJHS 2.1 score at $T_1$ minus the HJHS 2.1 score at $T_0$. Change in joint health is assessed with ΔHJHS 2.1. For FIGS. 4a, 5a and 6a, it is considered that there is an improvement in joint health when ΔHJHS 2.1≥−4, a deterioration in joint health when ΔHJHS 2.1≥4, the joint health remains constant when ΔHJHS 2.1 is from −3 to 3, and NA when no suitable data is available. For FIGS. 4b, 5b and 6b, it is considered that there is an improvement in joint health when ΔHJHS 2.1<0, a deterioration in joint health when ΔHJHS 2.1>0, the joint health remains constant when ΔHJHS 2.1=0, and NA when no suitable data is available. Percentages of patients meeting the relevant criteria for "improvements", "deterioration", "constant" and "NA" are calculated, and shown in the Figures.

As shown in the Figures, using the stricter criteria, 18.5% of participants (n=54) experienced an improvement in joint health 1 year after the administration of gene therapy vehicle comprising AAV5-PaduaFIX (FIG. 4a). Using the more relaxed criteria, 44.4% of participants reported improvement in joint health 1 year after the treatment (FIG. 4b). In a different, smaller group (n=3) (FIG. 6a), 1 of the 3 participants reported improvement in joint health after 1 year, and a further 1 reported improvement after 2 years, following the treatment of the invention. Participant 3 had an increase of 5 (total HJHS score) over the study period. However, this patient had worsening avascular hip necrosis, which required two surgeries over the two years of follow-up.

Similarly, using the stricter criteria, 10% of participants (n=10) experienced an improvement in joint health 1 year after the administration of gene therapy vehicle comprising AAV5-wildtype FIX (FIG. 5a), and the percentage increased to 50% after 5 years following the treatment. Using the more relaxed criteria, 40% participants already reported improvement in joint health 1 year after the treatment. By 5 years following the treatment, 80% of the participants reported improvement in joint health (FIG. 5b).

TABLE 1

Concentration % mean steady state following AAV5-wildtypeFIX administration.

| Cohort | Participant | Mean | Lower (95% CI) | Upper (95% CI) |
|---|---|---|---|---|
| 1 | 1* | 66.80 | 62.44 | 71.15 |
|   | 2* | 12.83 | 12.13 | 13.54 |
|   | 3 | 1.37 | 1.15 | 1.60 |
|   | 4 | 5.41 | 5.19 | 5.62 |
|   | 5 | 2.44 | 2.29 | 2.60 |
| 2 | 6 | 9.62 | 8.62 | 10.61 |
|   | 7 | 10.71 | 10.02 | 11.39 |
|   | 8 | 6.75 | 6.31 | 7.18 |
|   | 9* | 100.94 | 96.63 | 105.24 |
|   | 10 | 4.75 | 4.54 | 4.95 |

TABLE 2

Joint health score (HJHS 2.1) state following AAV5-wildtypeFIX administration.

| | Cohort 1 | | | Cohort 2 | | |
|---|---|---|---|---|---|---|
| Time | Mean | SD | N | Mean | SD | N |
| Baseline | 24.4 | 17.5 | 5 | 6.8 | 6.5 | 5 |
| Year 1 | 23.4 | 18.8 | 5 | 9 | 7.2 | 4 |
| Year 2 | 20 | 15.4 | 5 | 3 | 3.6 | 3 |
| Year 3 | 20.6 | 16.5 | 5 | 5.5 | 9.1 | 4 |
| Year 4 | 20.8 | 17.6 | 4 | 6.3 | 5.1 | 4 |
| Year 5 | 19.2 | 15.0 | 5 | 4.4 | 4.3 | 5 |

REFERENCE LIST

1. Chang J, Jin J, Lollar P, Bode W, Brandstetter H, Hamaguchi N, Straight D L, Stafford D W. Changing residue 338 in human factor IX from arginine to alanine causes an increase in catalytic activity. J Biol Chem. 1998 May 15; 273(20):12089-94. doi: 10.1074/jbc.273.20.12089. PMID: 9575152.
2. GaO G & Sena-Esteves M, in Molecular Cloning (eds Green, M. R. & Sambrook, J. R.) 1209-1330 (Cold Spring Harbor Laboratory Press, 2012).
3. Graf L. Extended Half-Life Factor VIII and Factor IX Preparations. Transfus Med Hemother. 2018; 45(2): 86-91. doi: 10.1159/000488060.
4. Kafri T, Blamer U, Peterson D A, Gage F H, Verma I M. Sustained expression of genes delivered directly into liver and muscle by lentiviral vectors. Nat Genet. 1997 November; 17(3): 314-7. doi: 10.1038/ng1197-314. PMID: 9354796.
5. Knabe K, Berntorp E. Haemophilia and joint disease: pathophysiology, evaluation, and management. J Comorb. 2011; 1:51-59. Published 2011 Dec. 27. doi: 10.15256/joc.2011.1.2.
6. Kuijlaars I a. R, Timmer M A, de Kleijn P, Pisters M F, Fischer K. Monitoring joint health in haemophilia: Factors associated with deterioration. Haemophilia. 2017; 23(6): 934-940.
7. Lin C N, Kao C Y, Miao C H, Hamaguchi N, Wu H L, Shi G Y, Liu Y L, High K A, Lin S W. Generation of a novel factor IX with augmented clotting activities in vitro and in vivo. J Thromb Haemost. 2010 August; 8(8):1773-83. doi: 10.1111/j.1538-7836.2010.03913.x. Epub 2010 May 21. PMID: 20492477.
8. Madsbad S. Insulin analogues: have they changed insulin treatment and improved glycaemic control? Diabetes Metab Res Rev. 2002 January-February; 18 Suppl 1:S21-8. doi: 10.1002/dmrr.206. PMID: 11921426.
9. Nair N, De Wolf D, Nguyen P A, Pham Q H, Samara E, Landau J, Blouse G E, Chuah M K, VandenDriessche T. Gene Therapy For Hemophilia B Using CB 2679d-GT: A Novel Factor IX Variant With Higher Potency Than Factor IX Padua. Blood. 2021 Mar. 18:blood.2020006005. doi: 10.1182/blood.2020006005. Epub ahead of print. PMID: 33735915.
10. Nathwani A C, Gray J T, Ng C Y, et al. Self-complementary adeno-associated virus vectors containing a novel liver-specific human factor IX expression cassette enable highly efficient transduction of murine and non-human primate liver. Blood. 2006; 107(7): 2653-2661. doi: 10.1182/blood-2005-10-4035.
11. Nichols T C, Levy H, Merricks E P, Raymer R A, Lee M L. Preclinical evaluation of a next-generation, subcutaneously administered, coagulation factor IX variant, dalcinonacog alfa. PLoS One. 2020 Oct. 28; 15(10):e0240896. doi: 10.1371/journal.pone.0240896. PMID: 33112889; PMCID: PMC75927 42.
12. Samelson-Jones B J, Finn J D, Raffini L J, Merricks E P, Camire R M, Nichols T C, Arruda V R. Evolutionary insights into coagulation factor IX Padua and other high-specific-activity variants. Blood Adv. 2021 Mar. 9; 5(5): 1324-1332. doi: 10.1182/bloodadvances.2019000405. PMID: 33656538; PMCID: PMC7948292.
13. Santagostino E, Martinowitz U, Lissitchkov T, et al. Long-acting recombinant coagulation factor IX albumin fusion protein (rIX-FP) in hemophilia B: results of a phase 3 trial. Blood. 2016; 127(14):1761-1769.
14. Schmidt A E, Bajaj S P. Structure-function relationships in factor IX and factor IXa. Trends Cardiovasc Med. 2003 January; 13(1):39-45. doi: 10.1016/s1050-1738(02) 00210-4. PMID: 12554099.
15. Simioni P, Tormene D, Tognin G, et al. X-linked thrombophilia with a mutant factor IX (factor IX Padua). N Engl J Med. 2009; 361(17):1671-1675.
16. Spronck E A, Liu Y P, Lubelski J, Ehlert E, Gielen S, Montenegro-Miranda P, de Haan M, Nijmeijer B, Ferreira V, Petry H, van Deventer S J. Enhanced Factor IX Activity following Administration of AAV5-R338L "Padua" Factor IX versus AAV5 wr Human Factor IX in NHPs. Mal Ther Methods Clin Dev. 2019 Sep. 26; 15:221-231. doi: 10.1016/j.omtm.2019.09.005. PMID: 31709273; PMCID: PMC683497 4.
17. Srivastava A, Brewer A K, Mauser-Bunschoten E P, Key N S, Kitchen S, Llinas A, Ludlam C A, Mahlangu J N, Mulder K, Poon M C, Street A; Treatment Guidelines Working Group on Behalf of The World Federation Of Hemophilia. Guidelines for the management of hemophilia. Haemophilia. 2013 January; 19(1):e1-47. doi: 10.1111/j.1365-2516.2012.02909.x. Epub 2012 Jul. 6. PMID: 22776238.
18. Urabe M, Nakakura T, Xin K O, Obara Y, Mizukami H, Kume A, Katin R M, Ozawa K. Scalable generation of high-titer recombinant adeno-associated virus type 5 in insect cells. J Viral. 2006 February; 80(4):1874-85. doi: 10.1128/JV1.80.4.1874-1885.2006. PMID: 16439543; PMCID: PMC1367135.
19. Wang D, Tai P W L, Gao G. Adena-associated virus vector as a platform for gene therapy delivery. Nat Rev Drug Discov. 9 May; 18(5):358-378. 1 1038/s41573-019-0012-9. PMID: 307101 PMCI PMC6927556.
20. Wright J F. Codon Modification and PAMPs in Clinical AAV Vectors: The Tortoise or the Hare?. Mal Ther. 2020; 28(3):701-703. doi: 10.1016/j.ymthe.2020.01.026.

21. Wu W, Xiao L, Wu X, Xie X, Li P, Chen C, Zheng Z, Ai J, Valencia C A, Dong B, Ding Q, Dong B, Wang X. Factor IX alteration p.Arg338Gln (FIX Shanghai) potentiates FIX clotting activity and causes thrombosis. Haematologica. 2021 Jan. 1; 106(1):264-268. doi: 10.3324/haematol.2019.216713. PMID: 32079698; PMCID: PMC7776343.
22. Young G, Collins P W, Colberg T, et al. Nonacog beta pegol (N9-GP) in haemophilia B: A multinational phase III safety and efficacy extension trial (paradigmTM4). Thromb Res. 2016; 141:69-76.

The invention claimed is:

1. A method of preventing, arresting and/or treating an effect of hemophilic arthropathy of a joint in a patient having hemophilia B, comprising:
measuring a pre-treatment baseline HJHS 2.1 score;
administering to the patient an effective amount of a gene therapy vehicle;
measuring a post-treatment HJHS 2.1 score at least 1 year after the administering; and
comparing the pre-treatment baseline HJHS 2.1 score to the post-treatment baseline HJHS 2.1 score;
wherein the gene therapy vehicle comprises a promoter and a nucleic acid that encodes a coagulation Factor IX or a hyperactive variant thereof;
wherein the effect of hemophilic arthropathy is at least one of pain, loss of range of motion, loss of activities, restrictions in participation in society, joint bleeds, synovitis, chronic arthropathy, or combinations thereof; and
wherein the post-treatment HJHS 2.1 score is no higher than pre-treatment baseline HJHS 2.1 score.

2. The method of claim 1, wherein the gene therapy vehicle is administered via intravenous infusion.

3. The method of claim 1, wherein the post-treatment HJHS 2.1 score is lower than the pre-treatment baseline HJHS 2.1 score.

4. The method of claim 1, wherein the patient having hemophilia B has a level of Factor IX activity of less than 1 IU/dL.

5. The method of claim 1, wherein the vehicle is a viral vector.

6. The method of claim 5, wherein the viral vector is an AAV particle.

7. The method of claim 6, wherein the viral vector is an AAV5 particle.

8. The method of claim 1, wherein the nucleic acid encodes a wildtype Factor IX.

9. The method of claim 1, wherein the gene therapy vehicle is administered at a dose of from $8\times10^{10}$ vg/kg to $2\times10^{13}$ vg/kg.

10. The method of claim 1, wherein the gene therapy vehicle is administered in a single dose.

11. The method of claim 1, wherein the joint is selected from the group consisting of one or both elbows, one or both knees, one or both ankles, and combinations thereof.

12. The method of claim 1, wherein the patient is a human.

13. The method of claim 1, wherein after administering the gene therapy vehicle to the patient, Factor IX activity level peaks and troughs are no more than about 25% above or below the average activity levels.

14. The method of claim 1, wherein after administering the gene therapy vehicle to the patient, Factor IX activity level peaks and troughs are no more than about 10% above or below the average activity levels.

15. The method of claim 1, wherein the nucleic acid encodes a hyperactive variant of Factor IX.

16. The method of claim 15, wherein the hyperactive variant of Factor IX is Factor IX-R-338L.

17. The method of claim 6, wherein the AAV particle is an AAV1 particle, an AAV2 particle, an AAV3 particle, an AAV4 particle, an AAV5 particle, an AAV6 particle, an AAV7 particle, an AAV8 particle, an AAV9 particle, an AAVrh10 particle, or an AAV11 particle.

* * * * *

SEQUENCE LISTING

```
Sequence total quantity: 1
SEQ ID NO: 1           moltype = AA  length = 415
FEATURE                Location/Qualifiers
source                 1..415
                       mol_type = protein
                       organism = Homo sapiens
VARIANT                86
                       note = Xaa = V (WT) or A
VARIANT                148
                       note = Xaa = A (WT) or T (WT)
VARIANT                277
                       note = Xaa = E (WT) or A
VARIANT                318
                       note = Xaa = R (WT) orY
VARIANT                338
                       note = Xaa = R (WT) or L or Q or E or A
VARIANT                343
                       note = Xaa = T (WT) or R
SEQUENCE: 1
YNSGKLEEFV QGNLERECME EKCSFEEARE VFENTERTTE FWKQYVDGDQ CESNPCLNGG   60
SCKDDINSYE CWCPFGFEGK NCELDXTCNI KNGRCEQFCK NSADNKVVCS CTEGYRLAEN  120
QKSCEPAVPF PCGRVSVSQT SKLTRAEXVF PDVDYVNSTE AETILDNITQ STQSFNDFTR  180
VVGGEDAKPG QFPWQVVLNG KVDAFCGGSI VNEKWIVTAA HCVETGVKIT VVAGEHNIEE  240
TEHTEQKRNV IRIIPHHNYN AAINKYNHDI ALLELDXPLV LNSYVTPICI ADKEYTNIFL  300
KFGSGYVSGW GRVFHKGXSA LVLQYLRVPL VDRATCLXST KFXIYNNMFC AGFHEGGRDS  360
CQGDSGGPHV TEVEGTSFLT GIISWGEECA MKGKYGIYTK VSRYVNWIKE KTKLT       415
```